COMBINED-ORDER INSTRUCTIONS FOR A DATA PROCESSOR

Filed Oct. 7, 1964 4 Sheets-Sheet 1

INVENTOR
W. ULRICH
BY John C Albrecht
ATTORNEY

COMBINED-ORDER INSTRUCTIONS FOR A DATA PROCESSOR

Filed Oct. 7, 1964

4 Sheets-Sheet 2

COMBINED-ORDER INSTRUCTIONS FOR A DATA PROCESSOR

Filed Oct. 7, 1964 4 Sheets-Sheet 3

FIG. 4

| 27 | 26 | 25 | 24 | 23 | ORDER |
|---|---|---|---|---|---|
| 1 | 0 | | | | READ, RD, 25-0 |
| 0 | 0 | | | | REGISTER - TO - REGISTER, RTR, 25-0 |
| 0 | 1 | 0 | | | WRITE, WRT, 24-0 |
| 0 | 1 | 1 | 0 | 0 | SHIFT, SFT, 22-14 |
| 0 | 1 | 1 | 1 | 0 | TRANSFER, XFR, 22-0 |
| | | | | | |
| 1 | 1 | | | | SHIFT-READ, SFT-RD, 25 - 0 |
| 0 | 1 | 1 | 0 | 1 | SHIFT - TRANSFER, SFT - XFR, 22-0 |
| 0 | 1 | 1 | 1 | 1 | SHIFT-WRITE, SFT-WRT, 22-0 |

United States Patent Office 3,360,779
Patented Dec. 26, 1967

3,360,779
COMBINED-ORDER INSTRUCTIONS FOR A DATA PROCESSOR

Werner Ulrich, Colts Neck, N.J., assignor to Bell Telephone Laboratories, Incorporated, New York, N.Y., a corporation of New York Filed Oct. 7, 1964, Ser. No. 402,090
13 Claims. (Cl. 340—172.5)

ABSTRACT OF THE DISCLOSURE

I disclose a stored program data processor in which two separate operations, e.g., reading from memory and shifting, are executed within the same machine cycle in accordance with a single instruction word. By limiting the range of memory locations which can be accessed, part of the address portion of the instruction word is rendered available so that it can be used to specify one of the orders to be executed.

Figure 1:
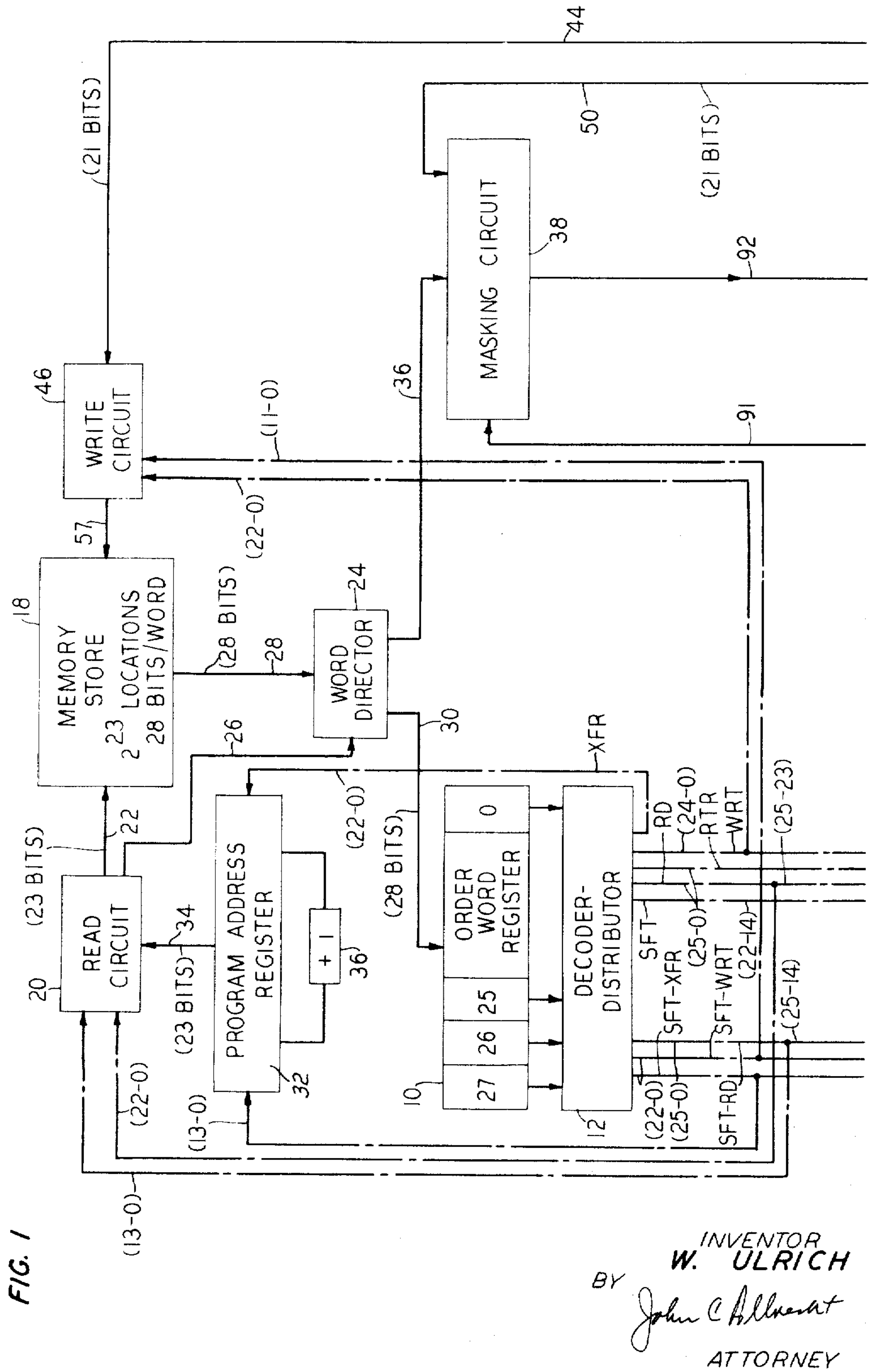

This invention relates to data processing equipment and more particularly to arrangements for increasing the processing capacity of the equipment in a given interval of time, such as the time for executing an order specified by a single instruction word.

Because of economic considerations the design of a practical data processing system always involves a number of compromises. The processing capacity of a data processor may be increased by the use of extremely high speed devices; however, since such devices tend to be more costly and often less reliable than slower speed devices, the choice of the components is thus often a compromise between the fastest available devices and less costly slower speed devices. Similarly, were it not for economic considerations extremely dependable systems could be achieved by extremely costly redundant combinations of equipment. Further, often the length of both the instruction and data words employed in a data processing system are much shorter than the designer might wish to make them. Here again, however, the cost of memory increases as the length of the words increases and thus for economic reasons instruction and data words containing a smaller than desired number of bits are often employed.

The above arrangements for increasing data processing capacity, for improving system dependability and for increasing system flexibility might be termed "brute force" methods in that they involve straightforward principles of buying bandwidth with cost, buying dependability with redundancy and buying increased flexibility with increased coding capacity.

Practical systems arrangements, such as I set forth herein, which achieve desired results such as increased data processing capacity through improved circuit arrangements and with only mederate cost as opposed to costly brute force methods are extremely important.

A data processing system generally includes a memory system for storing instruction words and data, and a processor for obtaining information from the memory system, for writing information into the memory system and for processing data in accordance with the instructions obtained from the memory system. An extremely useful sequence of data processing operations involves the obtaining of data from the memory system, placing the data in a destination register and subsequently manipulating that data. For example, in a logical data processor it is often desirable to adjust the information read from memory either by shifting or rotating the data elements to the left or to the right. In such a sequence a first instruction specifies that the memory be read at a particular location and the contents of memory at that location be placed in a specified machine register. A succeeding instruction is obtained from the memory and this instruction specifies that the previously obtained word be adjusted to the left or right by a specified amount.

In accordance with my invention I have provided arrangements whereby, with a single instruction and without increasing the time required to execute a single instruction, a first word may be read from memory and simultaneously a second word in one of the machine registers may be adjusted to the left or to the right by shifting or rotating the second word an amount specified by a single combined instruction; alternatively, the same word read from memory into a register may be adjusted by shifting or rotating during execution of the single instruction. Similarly, in accordance with my invention, by means of a single instruction word, again without extending the time required to execute a single instruction, it is possible to obtain information from a location within the data processor, to write that information into the memory at a location specified by the instruction and to simultaneously adjust, by shifting or rotating a different data word in one of the machine registers or to adjust the word to be written prior to the writing operation. Such single instructions which serve to manipulate data within the data processor while obtaining data from the memory or writing data into the memory within the same machine cycle are termed herein combined orders.

Thus, in accordance with my invention, the data processing capacity of a data processing machine is increased since the work functions which previously required the execution of two successive instructions are completed by the execution of a single combined instruction.

As set forth herein, the coding capacity of the combined instruction word required to control the adjusting (shifting or rotating) is obtained in this one specific illustrative embodiment by limiting the range of addresses which may be read from or written into memory when executing such combined orders.

It is a general object of this invention to control the simultaneous executions of two orders in a data processor, in accordance with a single instruction word.

It is another object of this invention to provide a data processor wherein two orders may be specified by the same instruction word—even where the instruction word contains a number of bits fewer than the sum of the numbers of bits required to specify the two orders individually.

It is still another object of this invention to transfer information within a data processor at the same time that a shift or rotate operation takes place, the transfer and shift operations both being determined by a single instruction word.

The principles of my invention may be best understood by considering a typical application. Consider a machine in which instruction words are 28 bits in length. Data words are stored in a memory which contains $2^{23}$ addresses, a 23-bit address thus being required to identify a memory word. When a read order is executed, one of the data words in the memory store is read out of the memory and into one of the registers included in the system. Five bits are required to specify the read order itself (including the identification of one of the registers). The remaining 23 bits in the instruction word identify any one of the $2^{23}$ addresses in the memory store from which a word is to be read.

In this system a shift order requires only 14 bits of an instruction word, of which 5 bits again specify the shift order itself and 9 bits are required to identify a particular register, the type of shift operation to be performed, the magnitude of the shift, and its direction. Thus, on a shift order, 14 of the 28 available bits in the instruction word are not used. Nevertheless shift and read orders priorly could not be specified by the same instruction word, as to designate both orders 28+14, or 42, bits are required and an instruction word contains only 28 bits.

In accordance with my invention, however, the machine is arranged and circuitry included so that a combined shift-read order is provided which may be expressed by a single instruction word. A new 5-bit code is added to those codes previously used in the machine. This code denominates both shift and read orders. Nine bits are still required to convey the shift information. Thus, only 14 bits in the instruction word remain. The only other information which must be carried in the instruction word is the address in the memory whose contents are to be read during the execution of the combined order. These 14 bits may specify any one of $2^{14}$ addresses in the memory store, rather than an address in the full range of $2^{23}$. Thus, when the instruction word represents the combined shift-read order the range of addresses is restricted. However, very often the word which must be read is contained within this restricted range. When programming the machine the programmer may control the storing of words, which will be subsequently read when combined orders are executed, in the first $2^{14}$ addresses of the memory. In this manner shift and read orders may be executed simultaneously and be controlled by the same instruction word, whereas heretofore it has been necessary to execute the two orders in two successive machine cycles and to provide two instruction words for expressing them.

The single or normal orders may still be executed, and in fact the normal read order is used, if the address to be specified is not within the restricted range. But in those many situations where the address is within the restricted range, especially where the particular word in the memory store has been purposely stored within this range in order that a combined order may be subsequently executed, the use of one of the new combined orders allows the execution of two orders in only one machine cycle.

It is a primary feature of this invention to include in a data processor circuitry for interpreting instruction words as representing two distinct orders, with the range of addresses in all such instruction words being restricted such that both orders may be specified together by the bits in a single instruction word.

Figure 2:
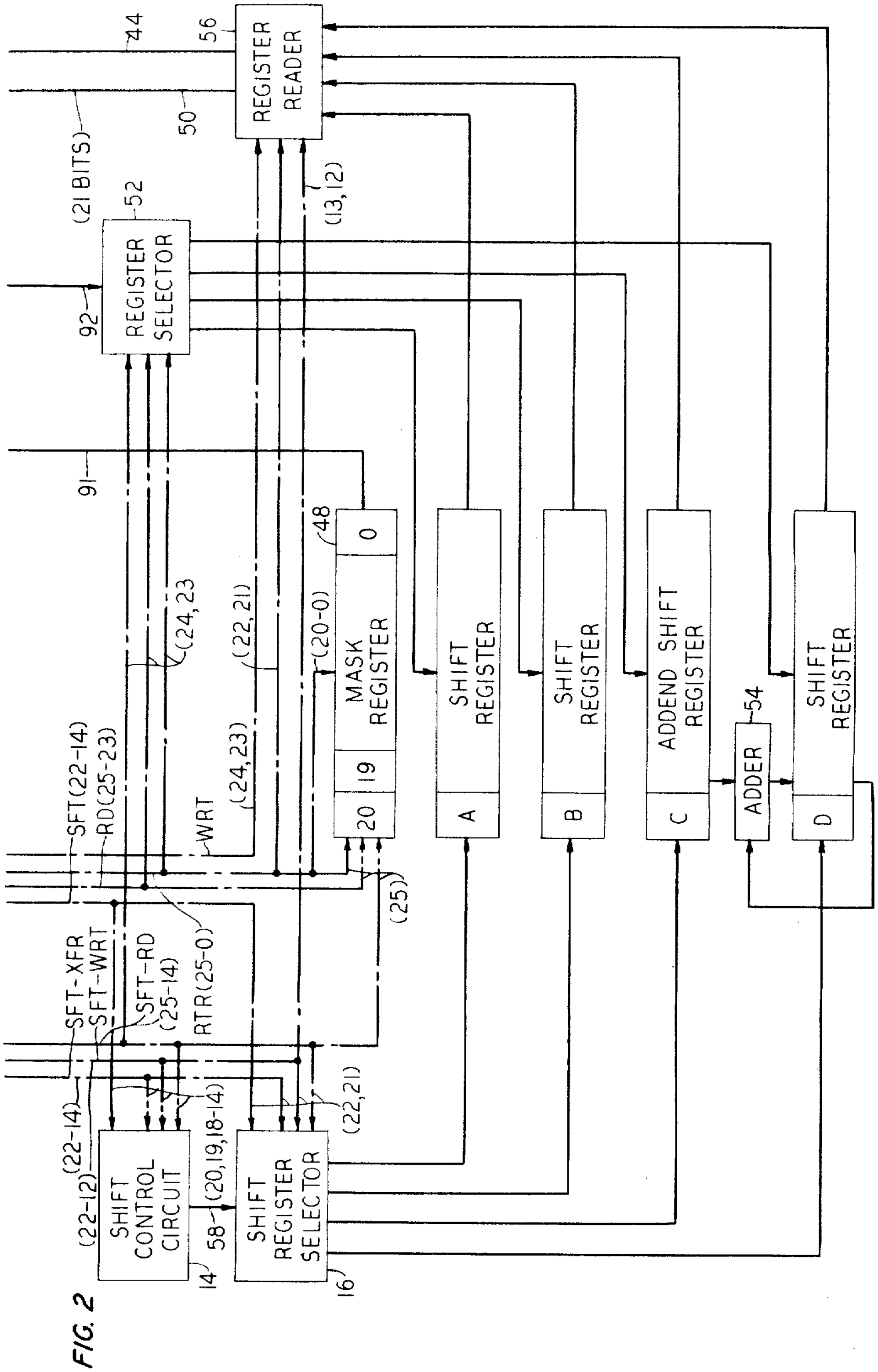
Figure 3:
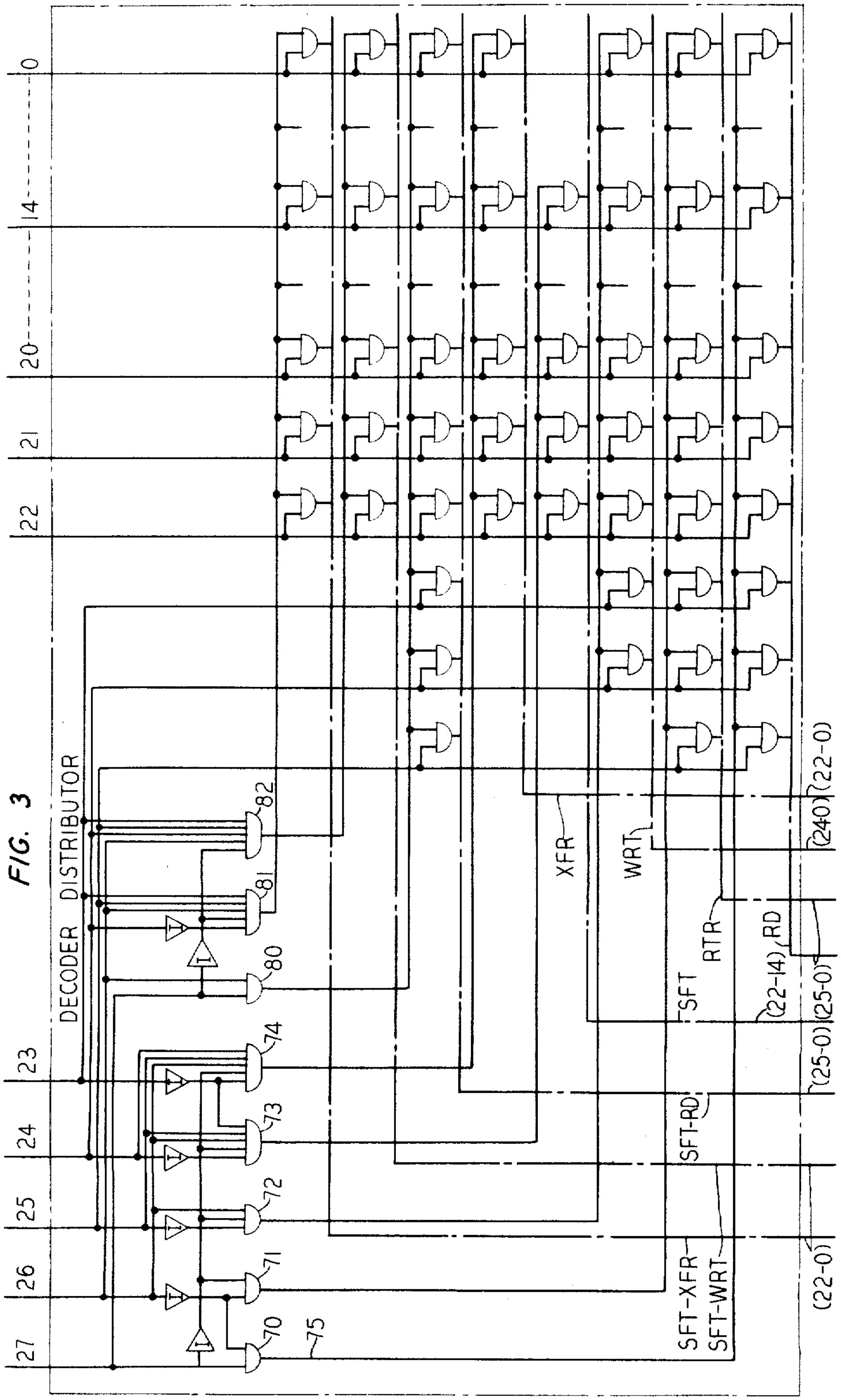

Further objects, features and advantages of the invention will become apparent upon consideration of the following detailed description in conjunction with the drawing, in which:

FIGS. 1 and 2 (with FIG. 1 placed on top of FIG. 2) are a schematic representation of a data processor illustrative of one embodiment of my invention;

FIG. 3 is a detailed schematic of illustrative circuitry which may comprise the decoder-distributor shown in FIGS. 1 and 2; and FIG. 4 is a table indicating the coding of various orders in the data processor of my invention.

In FIGS. 1 and 2 there is shown one illustrative embodiment of my invention incorporated in a data processor depicted in simplified form. Thus, various elements of data processors well known in the art but not necessary for an understanding of my invention, such as timing circuitry, have been omitted. Further, as various of the functional blocks depicted perform known and recognized operations, the details of such circuitry have not been shown. A specific data processor in which my invention may advantageously be employed is disclosed in Doblmaier et al. application Ser. No. 334,875, filed Dec. 31, 1963, and such disclosure is hereby incorporated herein.

In the drawing and subsequent description the bits of the various words are specified with the more significant or higher order bit first. Thus, bits 22–14 specifies the bits 22 through 14 in descending order of significance.

Turning now to FIGS. 1 and 2, there will first be explained the normal operation of the data processor utilizing the individual orders and then the operation of the circuitry to utilize combined orders in accordance with my invention.

In the embodiment of my invention depicted in FIGS. 1 and 2, any instruction word appearing in order word register 10 is decoded in decoder-distributor 12. The system includes five normal order cables, RD, WRT, RTR, SFT and XFR, each shown by a dotted line, in addition to the combined order cables discussed below. The decoder-distributor 12 applies various bits to one of these five order cables in accordance with the order coding shown in FIG. 4. The upper five rows of FIG. 4 represent the normal single orders which may be executed in the system of FIGS. 1 and 2. Only one of the five order cables is energized at any one time, depending on the order to be executed.

The numbers in parentheses in FIGS. 1 and 2 represent the bits in the instruction word whose values are transmitted along the order cables. For example, when a shift order is executed, bits 22–14 of the instruction word contained in order word register 10 are transmitted along respective conductors in order cable SFT to shift control circuit 14 and shift register selector 16. Certain of the cables in FIGS. 1 and 2 which are not order cables also have numbers within parentheses associated with them. These numbers are followed by the word "bits," and indicate the number of bits transmitted from one unit to another over the respective cable. These additional labels have been included only where they are required for the purpose of clarification.

Before the five normal orders which may be executed are discussed, certain remarks might be made concerning the individual circuits in the system. In this specific embodiment of my invention, memory store 18 comprises $2^{23}$ locations. Each of the memory locations contains a 28-bit word, which may be either a data word or an instruction word. Read circuit 20 transmits a 23-bit address to memory store 18 over cable 22. The read circuit also notifies word director 24 over cable 26 of the nature of the word to be read from the memory store. A 28-bit word is read from the memory store 18 and transmitted via cable 28 to the word director 24. If the word read is an instruction word to be sent to order word register 10, the full 28-bit word is transmitted via cable 30 to the order word register 10. The particular instruction word which is placed in order word register 10 is controlled by a program address register 32. The program address register successively applies 23-bit addresses to cable 34. Each address represents the location of an instruction word in memory store 18. Increment circuit 36 increments the number contained in program address register 32, and consequently, successive addresses are normally transmitted to memory store 18, and successively stored instructions are transmitted by word director 24 to order word register 10.

If instead of the address originating in program address register 32, a 23-bit address appears on order cable RD, read circuit 20 is notified that the word to be read is data and is to be directed to the masking circuit rather than the order word register. While a full 28-bit word is again read from the specified memory store location, only the 21 least significant bits, the data word, are transmitted to masking circuit 38.

It is also possible to write a word into the memory store when a write order is executed. Twenty-one bits are transmitted along cable 44 to write circuit 46. At the same time a 23-bit address is transmitted from the write (WRT) order cable to the write circuit. The 21-bit data word is written into the first 21 positions of the memory location specified by the address transmitted on the write order cable.

In many data processing machines, a mask option is available on various types of orders. A mask blocks the transmission of selected bits in a word being transferred from one part of the machine to another. For example, in a G-bit machine the word 101011 might be transferred from a memory store to a register. In the course of the transfer, the word passes through a masking circuit. Suppose the mask in the masking circuit is the word 011110. Each bit in the mask is associated with a respective digit in the word. If the mask bit is a 1 the respective digit of the word is allowed to pass through the masking circuit to be written into the register. If the mask bit is a 0 the respective digit in the word is blocked from passing through the masking circuit to the register. Thus, in the example selected, the only digits in the word which are passed through the masking circuit to the register are the four center digits 0101. The two outer digits in the word are blocked. Suppose the register originally contained the word 111000. The four digits coming through the masking circuit are written into the four center stages of the register. The two outer stages of the register are unaffected because no digits are passed through the masking circuit to be written into these stages. Thus, the final word appearing in the register after the masking operation is 101010. A mask option is often highly advantageous because it allows the writing of bits into only a portion of a register or a memory location. (In other machines "product" masking is available as well as the "insertion" masking just described. "Product" masking is described in the above-identified Doblmaier et al. application. My invention is equally applicable to such machines, and even to machines providing no mask option.)

The mask option may be provided in a particular machine for a variety of orders. In the system shown the mask option is provided on read and register-to-register orders. A 21-bit mask appears in mask register 48. A 21-bit word appears at the input of masking circuit 38 on either cable 36 or cable 50. If bit 25 in either order cable RD or order cable RTR is a 1, mask register 48 controls the masking of the word transmitted through the masking circuit by the mask in the mask register. If bit 25 is a 0, the input word to the masking circuit passes through it to cable 92 unaffected. If the mask option is not ordered, the 21-bit word on either cable 36 or 50 appears on cable 92. If the mask option is ordered, fewer than 21 bits will appear on cable 92 depending on the mask word stored in mask register 48.

When either the read or the register-to-register order is executed, bits 24 and 23 of the instruction word are transmitted to register selector 52. These bits specify one of the A, B, C and D registers. The 21-bit word on cable 42 is directed along one of the four output cables of the register selector to be written into a respective one of the four shift registers. If the C register, the addend shift register, is specified the masked word is written into this register and applied to one of the inputs of adder 54. The word in the D register is applied to the other input of the adder. The adder derives the sum word and writes it into the D register. The original masked word remains in the C register, and the contents of the D register are the sum of the word now in the C register and the previous contents of the D register. A word written directly into the D register by the register selector has no effect on the C register. Adder 54 is provided for controlling all addition operations. Two words may be added together by placing a first word in the D register and by writing the second word into the C register. The second word remains in the C register and the sum appears in the D register.

When either write or register-to-register orders are executed, register reader 56 operates. On a write order, order cable WRT is energized and bits 24 and 23 of the instruction word are transmitted to register reader 56. These bits specify one of the A, B, C and D registers. The register reader reads out the word from the register specified and applies it to cable 44. It is this 21-bit word which is written into the memory store. If, on the other hand, a register-to-register order is being executed and order cable RTR is energized, bits 22 and 21 of the instruction word are transmitted to register reader 56. The register reader operates in a similar manner but applies the 21-bit word read out of one of the registers to cable 50 rather than cable 44.

Shift control circuit 14 and shift register selector 16 control the shifting and rotating of the bits in one of registers A–D. When a shift order is executed, bits 20–14 are transmitted to shift control circuit 14 along order cable SFT. Bit 20 determines whether a shifting or rotating operation is to take place. Bit 19 specifies the direction, either left or right. The five bits 18–14 specify the magnitude of the shift. Shift control circuit 14 interprets the information represented by bits 20–14 and notifies shift register selector 16 over cable 58 of the nature, direction and magnitude of the shift operation to be performed. Bits 22 and 21 are transmitted directly along order cable SFT to shift register selector 16, and specify one of registers A–D. Shift register selector 16 then controls the shifting of the bits in one of the four shift registers over a respective cable in accordance with the information contained in bits 22–14. If the C register is specified, its contents are shifted in the normal manner. Adder 54 does not operate when the word in the C register is shifted or rotated. Adder 54 operates only when a new word is written into the C shift register by register selector 52.

Before considering the orders which may be executed in this embodiment on an individual basis, a few remarks might be made concerning memory store 18. The memory store includes input/output equipment, and may comprise a tape unit associated with a magnetic core matrix. Ten of the locations in the memory store are not contained in the core matrix, but instead specify ten respective registers in the tape unit. When one of these ten registers is specified the 21-bit word being written is written into one of these registers. The words in these registers control the operation of the tape unit. For example, a specific word in the tenth register might control the tape unit to scan the tape beginning with the word in the tape address contained in the first two registers (the tape may have up to $2^{42}$ addresses, and two 21-bit registers are required to identify a tape address), and match the word stored in the third register. When a match is detected, the tape address of the matched word will be written into the fourth and fifth registers. At a later time two successive read orders will specify the addresses of the fourth and fifth tape unit registers, and the tape address stored in these two registers will be transmitted to word director 24. In other words, the ten tape unit registers are treated just as are other locations in the memory store. The fact that the bits in these registers control the tape unit operation, and can further control the writing of data in the tape unit registers themselves, has no bearing on the system operation.

The operation of the system of FIGS. 1 and 2 on individual orders may be best understood by considering the manner in which each of the five types of orders is executed. Program address register 32 transmits 23-bit successively numbered addresses over cable 34 to read circuit 20. The read circuit controls the reading of the specified 28-bit instruction word from memory store 18, and controls word director 24 to transmit the full 28-bit word over cable 30 to order word register 10. The addresses in program address register 32 are incremented by increment circuit 36. When it is necessary to transfer to an instruction out of sequence order cable XFR is energized. As seen in FIG. 4 a transfer order is represented by the code 01110 in bits 27–23 of an instruction word. When this code appears in these bits of the order word register, bits 22–0 in the instruction word in the register are transmitted along order cable XFR to the program address register. These 23 bits are substituted in register 32 for the address originally contained therein, this original address having controlled the transmission to the order word register of the instruction which controls the transfer operation itself. Twenty-three bits are required to be transmitted to the program address register to identify the location of the next instruction. It is this new address in the program address register which is thereafter incremented to control the transmission to the order word register of successively addressed instructions. In FIG. 4 the "order" column of the table indicates the order, the order cable energized, and the bits transmitted along this order cable for each of the instruction word codes. When a transfer order is executed order cable XFR is energized, and bits 22–0 in the instruction word appear on the cable.

A shift order is represented by the code 01100 in bits 27–23 of an instruction word. Order cable SFT is energized, and bits 22–14 are transmitted along the order cable to shift control circuit 14 and shift register selector 16. Bit 20 notifies the shift control circuit of the type of shift operation to take place. If bit 20 is a 1 the bits in the register specified are shifted rather than rotated, and if bit 20 is a 0 the bits in the register are rotated rather than shifted. In a shift operation the bits at one end of the register are shifted out of the register, and 0's are written into the stages at the other end of the register. When the bits are rotated the bits shifted out of one end of the register are reinserted at the other end. Bit 19 controls the direction of the shift. If bit 19 is a 1 the bits in the specified register are rotated or shifted to the right, and if bit 19 is a 0 the bits are rotated or shifted to the left. Bits 18–14 control the magnitude of the shift. These five bits represent one of the numbers 1–22, and enable the shift control circuit to determine how many positions the bits in the specified register are to be shifted or rotated. The shift command signals appear on cable 58. Bits 22 and 21 are transmitted to shift register selector 16. These bits identify one of shift registers A–D. Shift register selector 16 directs the shift command signals on cable 58 to the specified register. Only bits 27–14 are required to represent a shift order, bits 27–23 representing the shift order code, and bits 22–14 representing the shift information required. Bits 13–0 in the instruction word are not used when a shift order is executed. Bits may appear in stages 13–0 of order word register 10, but decoder-distributor 12 is not controlled by these bits, nor does it transmit these bits to any of the system units.

A read order is represented by the code 10 in bits 27 and 26 of an instruction word. Order cable RD is energized and bits 25–0 are transmitted along respective conductors in this cable to various units in the system. Bits 22–0 are directed to read circuit 20. Bit 25 is transmitted to mask register 48. If bit 25 is a 1 the 21-bit mask in register 48 controls the masking of the 21-bit word transmitted to the masking circuit. Bits 24 and 23 in the read order cable notify register selector 52 of the identity of one of registers A–D, the masked word on cable 92 being transmitted by the register selector to the specified register. The masked word is stored in the register, and if it is stored in the C register the sum of the masked word and the previous contents of the D register are stored in the D register.

When the code 010 appears in bits 27–25 of the instruction word, order cable WRT is energized and a write order is executed. Bits 24 and 23 are transmitted to register reader 56 which reads the word from the register specified by these bits and applies the 21-bit word read to cable 44. At the same time bits 22–0 in the instruction word are transmitted to write circuit 46. Bits 22–0 identify a particular one of the $2^{23}$ locations in the memory store. The bits to be written as well as the addressing information are transmitted from write circuit 46 to memory store 18 over cable 57.

When the code 00 is contained in bits 27 and 26 of an instruction word a register-to-register order is executed. Order cable RTR is energized, and bits 22 and 21 notify register reader 56 of the identity of the register whose contents are to be read and directed along cable 50 to masking circuit 38. Bits 20–0 represent a 21-bit mask and are written directly into mask register 48. Bit 25 is a 1 if masking is to occur, and the mask written into the mask register controls the masking of the 21-bit word on cable 50 as it passes through the masking circuit to cable 92. Bits 24 and 23 are transmitted to register selector 52 and control the writing of the masked word into one of registers A–D.

It should be noted that when a read order is executed the mask must already appear in register 48 if the mask option is called for. A mask may be written into register 48 to be used on a read order as follows. A register-to-register order may be executed for which bit 25 in the instruction word is a 0. The mask in bits 20–0 will be stored in the mask register, to be used in the execution of a subsequent read order, but masking will not take place in the execution of the register-to-register order during which the mask is stored in register 48. When this register-to-register order is executed bits 24 and 23 may be the same as bits 22 and 21, in which case the word read from one of the shift registers is merely written into it again unchanged. In this manner a mask may be stored in the mask register to be subsequently used on a read order. It is also possible to transfer the word from one of the registers to another while the mask is being stored in register 48 for subsequent use in a read order. Bits 24 and 23 would in this case be different from bits 22 and 21.

It is important to recall why a single instruction word, as thus far discussed, may not control the execution of two orders simultaneously. Read, write, transfer and register-to-register orders each requires a 28-bit instruction word. A shift order requires only 14 bits (bits 13–0 are unused), but two orders may not be combined because the number of bits required to specify the two orders would exceed the 28 bits in an instruction word.

To enable a combined order, expressed by a single instruction word, to control the execution of two orders, in accordance with my invention three additional order cables are utilized. Order cable SFT–RD controls the simultaneous executions of shift and read orders. Order cable SFT–WRT controls the simultaneous executions of shift and write orders. Order cable SFT–XFR controls the simultaneous executions of shift and transfer orders.

Consider first the shift-transfer order. The combined order is represented by the new code 01101 in bits 27–23 of the instruction word, as shown in FIG. 4. Order cable SFT–XFR is extended to shift control circuit 14, shift register selector 16 and program address register 32, and the remaining bits in the instruction word, 22–0, are transmitted on the order cable to these units. Bits 22–14 are transmitted to shift control circuit 14 and shift register selector 16 to control the shift operation. These units operate in response to the bits transmitted to them just as they do when the normal shift order is executed. Bits 13–0 in the instruction word controlling the normal shift order are not used. However when the combined order is executed these bits are transmitted to program address register 32. These bits identify the address of the instruction to which the transfer is required. Ordinarily, 23 bits are required to transfer to a new instruction. Only 14 bits are available for this purpose in the shift-transfer order. These 14 bits are written into the 14 least significant stages in program address register 32. 0's are automatically written into the eight most significant positions. (Any of many well-known circuits may be utilized for this purpose.) Thus when the combined order is executed the transfer may be to only one of $2^{14}$ addresses rather than to one of $2^{23}$ addresses. The range of transfer is thus restricted. However, whenever the instruction to which the transfer is required is contained within the restricted range, the combined order may be executed rather than the normal or individual order. If the combined order is used a shift operation may occur at the same time that a transfer is taking place.

The new code 11 in bits 27 and 26 of the instruction word control the energization of the shift-read order cable. This order cable is extended to all of the units to which the old shift and read cables are connected. Bits 22–14 once again control the shift operation in the ordinary manner. Bit 25 controls the operation of mask register 48, and bits 24 and 23 control the operation of register selector 52. Shift control circuit 14, shift register selector 16, register selector 52 and mask register 48 operate precisely as they do when the respective individual shift and read orders are executed. The only difference in the operation of the system when the combined order is executed is that only bits 13–0 in the instruction word, the only bits remaining, are transmitted to read circuit 20, rather than bits 22–0 which are transmitted to the read circuit when the normal read order is executed. The read circuit again transmits a 23-bit address over cable 22 to the memory store, the read circuit automatically writing 0's into the nine most significant bits in the address transmitted to the memory store. Thus when the combined shift-read order is executed the word which may be read from the memory store is only one of $2^{14}$, rather than one of $2^{23}$. A 28-bit word is delivered on cable 28 to word director 24, the first 21 bits of which, the data word, are then directed over cable 36 to masking circuit 38.

The third combined order, shift-write, is represented by the new code 01111 in bits 27–23 of the instruction word. The remaining bits 22–0 are transmitted along order cable SFT–WRT to all of the units which operate when the individual shift and write orders are executed. Again, bits 22–14 are transmitted to shift control circuit 14 and shift register selector 16 to control the shift operation. Bits 13 and 12 are transmitted to register reader 56. When the normal write order is executed bits 24 and 23 control the operation of register reader 56. (When the normal register-to-register order is executed bits 22 and 21 control the operation of the register reader.) When the combined order is executed bits 13 and 12 identify that one of registers A–D whose contents are to be written into the memory store. Only bits 11–0 remain in the instruction word to specify the address in the memory store into which the word read is to be written. In the illustrative embodiment of the invention these bits represent any one of $2^{12}$ locations, into the first 21 bits of which is to be written the 21-bit word on cable 44.

The common characteristic of the three combined orders in the illustrative embodiment of the invention is that the unused bits in the individual shift order are used to specify another order as well. The address in each of these other orders is restricted due to the insufficient number of bits remaining in the instruction word. However, wherever the address to be specified on transfer, read or write orders in within a restricted range, the order may be executed simultaneously with a shift order in the same machine cycle. It is also possible, in accordance with the principles of the invention to combine other types of orders. For example, shift and register-to-register orders may be combined, with a mask containing fewer than 21 bits being transmitted to mask register 48. In such a situation the shortened mask in register 48 would mask fewer than all of the bits passing through the masking circuit. Similarly, it is possible to form combinations with orders other than the shift order. For example, transfer and read orders might be combined where the addresses in both orders are restricted. The system of FIGS. 1 and 2 merely illustrates the principles of the invention.

In the system of FIGS. 1 and 2 indexing is not provided. Indexing is a step which may occur in the execution of various orders. The address in an instruction word, for example, may be added to the number contained in a specified index register, and the sum is the effective address which is utilized in executing the order. If indexing is available in a particular machine, the range of addresses when executing one of the combined orders need not be restricted. The number contained in the specified index register, when added to the 12- or 13-bit address in the instruction word, may result in a 23-bit address. In such machines the only range restriction on a combined order would be in the address part of the instruction word which may be added to the contents of the specified index register.

In the above description only the relative times of operation of the various units during the execution of any order have been set forth. For example, in a register-to-register order, register reader 56 operates prior to the operation of register selector 52. When a combined order is executed two groups of units operate independently of each other. Shift control circuit 14 and shift register selector 16 control the shift operation independent of the various units which operate when transfer, read and write orders are executed. The timing of the various units may be controlled by any of well-known techniques. For example, timing circuits may be extended to each of the system units for controlling the time of operation of each of the units in accordance with the instruction word contained in order word register 10. With the combined orders incorporated in a system, in accordance with my invention, the timing scheme may be modified to provide particular advantageous sequences of operation. Very often it is necessary to shift a word in a register prior to writing it into the memory. The timing scheme may be modified such that when the shift-write order is executed the shift operation takes place prior to the writing of the shifted word into the memory. Similarly, it is often necessary to read a word from memory and then shift it in a shift register. The timing scheme may be controlled to allow the reading of a word from memory into a register prior to the shifting of this word when a shift-read order is executed. If the shift operation is relatively fast, the two combined orders may be executed in succession within a single machine cycle.

The connections of the three combined order cables to the various units whose operations they control are similar to the connections of the normal order cables to these units. Various simplifications may be made. For example, order cables RTR, RD and SFT–RD are all connected to mask register 48 for transmitting to this register bit 25 of the instruction word. The three conductors which carry this bit in the three respective cables may be connected through an OR gate to a single control input of the mask register. The input to the various other units may be simplified in similar manners.

To provide the three combined orders additional circuitry is required in the decoder-distributor, shown in FIG. 3. Referring to FIG. 3, it is seen that 28 conductors, each carrying one of the bits of the instruction word stored in order word register 10, enter the decoder-distributor at the top of the figure. Bits 27–23, or fewer than all of them, determine the type of order to be executed. One of gates 70–74 operates depending on the coding of bits 27–23. For example, when a read order is executed bit 27 is a 1 and bit 26 is a 0. Bit 1 is transmitted directly to one of the inputs of gate 70. Bit 26 is inverted by an inverter before being applied to the other input of gate 70. Thus a 1 is applied to the other input of gate 70 when bit 26 is a 0. When both inputs to gate 70 are 1's the gate operates and applies an enabling potential on conductor 75. This conductor is connected to one input of each of 26 gates. Each one of the bits 25–0 is applied to the other input of a respective one of these gates. The output of each of these gates thus has the value of the respective one of bits 25–0 when a read order is executed. Bits 25–0 thus appear on order cable RD to be extended to the various units requiring them when a read order is executed.

As another example consider the operation of gate 74 when a transfer order is executed. Bits 27–23 contain the code 01110. Bits 26–24 are connected directly to three of the inputs of gate 74. Bits 27 and 23 are connected to the other two inputs of the gate through inverters. Thus gate 74 operates when a transfer order is to be executed, and enables one input of each of the gates connecting the conductors carrying bits 21–0 to order cable XFR. Bits 21–0 are thus transmitted through the respective gates to respective conductors in the order cable when a transfer order is executed. When a shift order is executed gate 73 operates and enables the nine gates connecting the conductors carrying bits 22–14 to order cable SFT. Similar remarks apply to gates 71 and 72, and order cables WRT and RTR.

To cooperate with the combined order, in accordance with my invention, three additional gates 80–82 are provided to control the transmission of various bits in the instruction word to the three respective combined-order cables. Gate 80 operates when bits 27 and 26 are each a 1. This gate enables the 26 gates which connect the conductors carrying bits 25–0 to order cable SFT–RD. It should be noted that bits 25–23, which are used in the other orders combined as part of the order code, are transmitted through three respective gates to order cable SFT–RD.

Gate 81 operates when bits 27 and 24 are each a 0, and bits 26, 25 and 23 are each a 1. When gate 81 operates it enables 23 gates which transmit bits 22–0 to order cable SFT–XFR. Finally, gate 82 operates when the code 01111 is contained in bits 27–23 of the instruction word to control the transmission of bits 22–0 in the instruction word to order cable SFT–WRT.

Although the invention has been described with a certain degree of particularity it is to be understood that the above-described arrangement is merely illustrative of the principles of the invention. Numerous modifications may be made therein and other arrangements may be devised without departing from the spirit and scope of the invention.

What is claimed is:

1. A data processor comprising a memory store, a plurality of registers, an order distributor, means for transmitting successively stored instruction words from said memory store to said order distributor, each of said instruction words including an order part and a constant part, means responsive to a first order part of an instruction word being contained in said order distributor for reading into one of said registers the data word stored in the memory location represented by the constant part of the same instruction word, a mask register, a masking circuit, means responsive to said first order part being contained in said order distributor for controlling said masking circuit to mask the data word read from said memory store into said one of said registers by the mask contained in said mask register, means responsive to a second order part of an instruction word being contained in said order distributor for writing the data word in one of said registers into a memory location represented by the constant part of the same instruction word, means responsive to a third order part of an instruction word being contained in said order distributor for controlling said transmitting means to transmit successively stored instruction words from said memory store to said order distributor beginning with the instruction word stored in the location represented by the constant part of the same instruction word, means responsive to a fourth order part of an instruction word being contained in said order distributor for transferring the data word in one of said registers to another of said registers and for controlling said masking circuit and said mask register to mask said transferred data word by the bits in the constant part of the same instruction word, means responsive to a fifth order part of an instruction word being contained in said order distributor for controlling the shifting of the data word in one of said registers in the manner and by the magnitude represented by the constant part of the same instruction word, means responsive to a sixth order part of an instruction word being contained in said order distributor for enabling both said shifting means and said reading means, said shifting means and said reading means both being controlled by the constant part of the same instruction word, means responsive to a seventh order part of an instruction word being contained in said order distributor for enabling both said shifting means and said writing means, said shifting means and said writing means both being controlled by the constant part of the same instruction word, and means responsive to an eighth order part of an instruction word being contained in said order distributor for enabling both said shifting means and said transmitting controlling means, said shifting means and said transmitting controlling means both being controlled by the constant part of the same instruction word.

2. A data processor in accordance with claim 1 wherein said reading, writing and transmitting controlling means operate in their respective manners responsive to said respective order parts being contained in said order distributor depending upon the locations represented by respective first numbers of bits in the constant part of the instruction word contained in said order distributor, and said reading, writing and transmitting controlling means, when enabled by said respective enabling means, operate in their respective manners depending upon the locations represented by respective second numbers of bits in the constant part of the instruction word contained in said order distributor, said first numbers of bits being greater than said respective second numbers of bits.

3. A data processor comprising a memory store having $2^X$ word locations, a plurality of registers, an instruction register containing an instruction having two sections, one containing X bits and the other containing Y bits, means responsive to a first code being contained in said Y bits for reading into a selected one of said registers the word stored in that one of said $2^X$ locations represented by said X bits, shifting means responsive to a second code being contained in said Y bits for controlling the shifting of the word in one of said registers in accordance with Z of said X bits, where X is greater than Z, and means responsive to a third code being contained in said Y bits for controlling said shifting means to shift the word in one of said registers in accordance with said Z bits and for controlling said reading means to read into a selected one of said registers the word stored in that one of the first $2^{X-Z}$ locations in said memory represented by the remaining X–Z bits in said X bits.

4. A data processor comprising a memory store having $2^X$ word locations, a plurality of registers, an instruction register containing an instruction having two sections, one containing X bits and the other containing Y bits, means responsive to a first code being contained in said Y bits for writing the word contained in a selected one of said registers into that one of said $2^X$ locations represented by said X bits, shifting means responsive to a second code being contained in said Y bits for controlling the shifting of the word in one of said registers in accordance with Z of said X bits, where X is greater than Z, and means responsive to a third code being contained in said Y bits for controlling said shifting means to shift the word in one of said registers in accordance with said Z bits and for controlling said writing means to write the word in a selected one of said registers into that one of the first $2^{X-Z}$ locations in said memory represented by the remaining X–Z bits in said X bits.

5. A data processor comprising a memory having $2^X$ locations, a plurality of registers, an instruction register, means for transmitting successively stored instructions from said memory to said instruction register, said instruction register having two sections, one containing X bits and the other containing Y bits, means responsive to a first code being contained in said Y bits for controlling said transmitting means to transmit successively stored instructions from said memory to said instruction register beginning with the instruction stored in that one of said $2^X$ locations represented by said X bits, shifting means responsive to a second code being contained in said Y bits for controlling the shifting of the word in one of said registers in accordance with Z of said X bits, where X is greater than Z, and means responsive to a third code being contained in said Y bits for controlling said shifting means to shift the word in one of said registers in accordance with said Z bits and for controlling said transmitting means to transmit successively stored instructions from said memory to said instruction register beginning with the instruction stored in that one of the first $2^{X-Z}$ locations in said memory represented by the remaining bits in said X bits.

6. A data processor comprising a memory store, a plurality of registers, an order distributor, said order distributor containing an instruction word including an order part and a constant part, means responsive to a first order part being contained in said order distributor for reading into one of said registers the data word stored in the memory location represented by the constant part contained in said order distributor, means responsive to a second order part being contained in said order distributor for controlling the shifting of the data word in one of said registers in the manner and by the magnitude represented by the constant part contained in said order distributor, and means responsive to a third order part being contained in said order distributor for controlling said reading means to read into one of said registers the data word stored in the memory location represented by a portion of the constant part contained in said order distributor and for controlling said shifting means to shift the data word in one of said registers in the manner and by the magnitude represented by the remaining portion of said constant part.

7. A data processor comprising a memory store, a plurality of registers, an order distributor, said order distributor containing an instruction word including an order part and a constant part, means responsive to a first order part being contained in said order distributor for writing the data word in one of said registers into a memory location represented by the constant part contained in said order distributor, means responsive to a second order part being contained in said order distributor for controlling the shifting of the data word in one of said registers in a manner and by the magnitude represented by the constant part contained in said order distributor, and means responsive to a third order part being contained in said order distributor for controlling said writing means to write the data word in one of said registers into a memory location represented by a portion of the constant part contained in said order distributor and for controlling said shifting means to shift the data word in one of said registers in a manner and by the magnitude represented by the remaining portion of said constant part.

8. A data processor comprising a memory store, an order distributor, a plurality of registers, means for transmitting successively stored instruction words from said memory to said order distributor, each of said instruction words including an order part and a constant part, means responsive to a first order part being contained in said order distributor for controlling said transmitting means to transmit successively stored instruction words from said memory to said order distributor beginning with the instruction word stored in the location represented by the constant part contained in said order distributor, shifting means responsive to a second order part being contained in said order distributor for controlling the shifting of the data word in one of said registers in a manner and by the magnitude represented by the constant part contained in said order distributor, and means responsive to a third order part being contained in said order distributor for controlling said transmitting means to transmit successively stored instruction words from said memory to said order distributor beginning with the instruction word stored in the location represented by a portion of the constant part contained in said order distributor and for controlling said shifting means to shift the data word in one of said registers in a manner and by the magnitude represented by the remaining portion of said constant part.

9. A data processor comprising a plurality of memory and register locations, an order distributor, said order distributor containing an instruction word including an order part and a constant part, means responsive to a first order part of an instruction word being contained in said order distributor for transferring a data word between two of said locations in accordance with the constant part of the same instruction word, means responsive to a second order part of an instruction word being contained in said order distributor for shifting the data word in one of said locations in accordance with the constant part of the same instruction word, and means responsive to a third order part of an instruction word being contained in said order distributor for controlling said shifting means to shift the data word in one of said locations in accordance with some of the bits in the constant part of the same instruction word and for controlling said transferring means to transfer a data word between two of said locations in accordance with the remaining bits in said constant part.

10. A data processor comprising means defining a plurality of memory locations, an order distributor containing therein an instruction word, means responsive to a first type of instruction word being contained in said order distributor for transferring a data word between any two of said memory locations in accordance with said first type of instruction word, means responsive to a second type of instruction word being contained in said order distributor for shifting the data word in any one of said memory locations in accordance with said second type of instruction word, and means responsive to a third type of instruction word being contained in said order distributor for controlling said shifting means to shift the data word in any one of said memory locations in accordance with said third type of instruction word and for controlling said transferring means to transfer a data word from a first memory location to a second memory location, both of said first and second memory locations being contained within a group of memory locations fewer in number than the total number of memory locations in said data processor.

11. A data processor comprising means defining a plurality of memory locations, an instruction register, first means for performing a first type of data processing operation of the data word stored in any one of said memory locations responsive to a first type of instruction word being contained in said instruction register, second means for performing a second type of data processing operation on the data word stored in one of said memory locations responsive to a second type of instruction word being contained in said instruction register, and means responsive to a third type of instruction word being contained in said instruction register for controlling said second means to perform said second type of data processing operation on the data word stored in one of said memory locations and for controlling said first means to perform and first type of data processing operation on the data word stored in one of a number of memory locations fewer in number than the total number of said memory locations.

12. A data processor having a memory with a first number of locations, means for operating on a word in one of said memory locations, means for representing an order to be executed by said data processor, means responsive to a first order being contained in said representing means for shifting the word contained in one of said memory locations, and means responsive to a second order being contained in said representing means for controlling said operating means to operate on the word in any one of said first number of memory locations, characterized by means responsive to a third order being contained in said representing means for controlling the operation of said shifting means, and means responsive to said third order being contained in said representing means for controlling said operating means to operate on the word in any one of a second number of locations in said memory, said second number of locations being fewer than said first number of locations.

13. In a data processor having a memory store, an order distributor, said order distributor containing an instruction word including an order part and a constant part, and a plurality of groups of data processing means, each of said groups operating responsive to a respective order part being contained in said order distributor in a manner determined by the constant part contained in said order distributor, the improvement comprising a plurality of decoder means each responsive to a respective order part being contained in said order distributor for controlling the operation of two of said groups of data processing means, each of said two groups operating in a manner determined by a portion of the constant part contained in said order distributor, wherein some of said groups of data processing means when operating alone responsive to the respective order parts being contained in said order distributor operate on a data word contained in or to be written into a memory location represented by all of the bits included in the constant part contained in said order distributor, and said some groups of data processing means when operating together with another group of said data processing means responsive to respective order parts being contained in said order distributor operate on a data word contained in or to be written into a memory location represented by only the respective portion of the constant part contained in said order distributor.

References Cited

UNITED STATES PATENTS

| | | | |
|---|---|---|---|
| 3,111,648 | 11/1963 | Marsh et al. | 340—172.5 |
| 3,161,763 | 12/1964 | Glaser | 340—172.5 |
| 3,229,260 | 1/1966 | Falkoff | 340—172.5 |
| 3,275,989 | 9/1966 | Glaser et al. | 340—172.5 |
| 3,277,449 | 10/1966 | Shooman | 340—172.5 |
| 3,287,702 | 11/1966 | Borck et al. | 340—172.5 |
| 3,287,703 | 11/1966 | Slotnick | 340—172.5 |
| 3,077,580 | 2/1963 | Underwood | 340—172.5 |
| 3,192,363 | 6/1965 | MacSorley | 235—164 |
| 3,228,005 | 1/1966 | Delmege et al. | 340—172.5 |
| 3,234,523 | 2/1966 | Blixt et al. | 340—172.5 |

PAUL J. HENON, *Acting Primary Examiner.*

ROBERT C. BAILEY, *Examiner.*

J. P. VANDENBURG, *Assistant Examiner.*